Patented Feb. 8, 1949

2,460,947

UNITED STATES PATENT OFFICE 2,460,947

PROCESS FOR THE PRODUCTION OF YEAST

Sven Olof Rosenqvist, Rotebro, Sweden, assignor to Svenska Jästfabriks Aktiebolaget, a joint-stock company of Sweden No Drawing. Application January 23, 1946, Serial No. 642,985. In Sweden November 25, 1943

6 Claims. (Cl. 195—91)

Methods are known in which molasses are used as raw material for the production of Torula yeast and other microorganisms, useful as feeding stuffs or for other nutritive purposes. There is likewise a known process for producing, from "sulphite wash," containing pentose sugar, microorganisms with a high protein content, such as, for example, Torula utilis, intended for use as feeding stuffs or for other nutritive purposes. "Sulphite wash" is the distiller's wash or draff obtained as residue after alcoholic fermentation of sulphite waste liquor and subsequent distillation of the alcohol from the fermented liquor. "Sulphite waste liquor" is obtained after digesting wood by means of sulphite liquor or lye.

In the production of Torula utilis from sulphite wash it has, however, been found that the fermentation times are considerably longer than in the production of Torula in a similar way from molasses or distiller's wash obtained from fermented and distilled molasses. It has also been found that, in the propagation of Torula in sulphite wash, considerable difficulties arise in regard to the quality of the Torula yeast, especially its colour and taste. Also in regard to the content of substances of vitamin character, the yeast, or microorganisms, produced from sulphite wash is of inferior quality than Torula yeast produced from molasses.

The propagation of Torula in sulphite wash can, however, be effected with considerably simpler and better apparatus than the corresponding propagation in molasses wort. An object of the present invention is to avoid the difficulties with regard to the colour and taste of Torula yeast as aforesaid, while still maintaining the advantages of propagating Torula utilis in sulphite wash.

A further object of the invention is to reduce the fermentation time considerably owing to the effect of the stimulating substances or factors in the molasses.

A still further object is to utilize the pentoses in the sulphite wash concurrently with the sugars in the molasses or molasses wash.

To these and other objects my invention comprises the step of producing substances useful as foodstuffs or for other nutritive purposes by propagation of microorganisms in a mixture of sulphite wash and molasses and/or molasses wash, if desired, together with sulphite waste liquor.

I have found that the protein compounds in the molasses have a favourable effect on the clearing and colouring conditions in the production of e. g. Torula utilis from sulphite wash. This applies also to distiller's wash from molasses which have undergone alcoholic fermentation and distillation. This wash is not necessarily richer in carbohydrates than the sulphite wash, but, thanks to the fact that it is obtained from molasses, it has, to a certain degree, the valuable properties of the latter.

In performing my invention the propagation of Torula yeast is effected in known manner continuously or discontinuously in the mixture of sulphite wash and molasses or molasses wash added with nutrients and neutralizing or chemical agents if necessary. After completed fermentation the yeast is separated from the wort and dried or treated in other way. The sulphite wash and the molasses wash is obtained as residual product after alcoholic fermentation of sulphite waste liquor and molasses wort, respectively, and distillation of the spirit. Such sulphite wash or molasses wash may be purified or further treated by means of chemical agents or it may be diluted or concentrated before the propagation with Torula utilis as above described. The alcoholic fermentation of the sulphite waste liquor may be executed by means of Torula utilis or any other suitable kind of yeast. Likewise, the alcoholic fermentation of the molasses may be executed by means of Saccharomyces cerevisiae or any other suitable kind of yeast.

According to one form of execution of the invention, the sulphite wash may be mixed with undiluted molasses or molasses wash before the neutralization or chemical treatment which precedes the fermentation of the sulphite wash into spirit or yeast.

The proportions in the mixture may be varied from case to case. Preferably, however, more sulphite wash than molasses or molasses wash should be used. For example, one may use 50–80 per cent of sulphite wash and 50–20 per cent of molasses or molasses wash.

What I claim is:

1. In a process for the production of yeast, useful as foodstuffs and for other nutritive purposes, the step of propagating the yeast in a nutrient medium containing a mixture of molasses wort and still residues from fermented sulphite waste liquor obtained as residue after alcoholic fermentation of sulphite waste liquor and subsequent distillation of the alcohol wherein the pentoses contained in said still residues will be fermented during said propagation of said mixture.

2. In a process for the production of yeast, useful as foodstuffs and for other nutritive purposes, the step of propagating the yeast in a nutrient medium containing a mixture of distilled fermented sulphite waste liquor obtained from alcoholic fermentation and subsequent distillation of sulphite waste liquor and of molasses wort wherein the pentoses in said waste liquor will be fermented during said propagation of said mixture.

3. In a process for the production of yeast, useful as foodstuffs and for other nutritive purposes, the step of propagating the yeast in a nutrient medium consisting of a mixture of molasses wort product, sulphite waste liquor and still residues from fermented sulphite waste liquor obtained as residue after alcoholic fermentation of sulphite waste liquor and subsequent distillation of the alcohol wherein the pentoses contained in said still residues will be fermented during said propagation of said mixture.

4. In a process for production of Torula yeast, the steps of propagating *Torula utilis* in a nutrient medium containing a mixture of fermented still residues from fermented sulphite waste liquor and fermented molasses wash wherein the pentoses contained in said still residues will be fermented during said propagation of said mixture and separating the produced Torula yeast from the said fermented medium after fermentation.

5. In a process for production of Torula yeast, the steps of propagating *Torula utilis* in a nutrient medium containing a mixture of fermented still residues from fermented sulphite waste liquor and molasses wort wherein the pentoses contained in said still residues will be fermented during said propagation of said mixture and separating the produced Torula yeast from the said fermented medium after fermentation.

6. In a process for production of Torula yeast, the steps of executing alcoholic fermentations of sulphite waste liquor with fermentation of the pentoses therein and of molasses wort, distilling off the alcohol produced by the said two fermenting processes, mixing the washes obtained after the said distillation of the sulphite waste liquor and of the molasses wort, and propagating *Torula utilis* in the said mixture.

SVEN OLOF ROSENQVIST.

REFERENCES CITED

The following references are of record in the file of this patent:

UNITED STATES PATENTS

| Number | Name | Date |
|---|---|---|
| 1,218,638 | Fest | Mar. 13, 1917 |
| 1,757,568 | Heijkanskjold | May 6, 1930 |
| 2,169,244 | Hildebrandt | Aug. 15, 1939 |